United States Patent
Park

(10) Patent No.: US 10,363,822 B2
(45) Date of Patent: Jul. 30, 2019

(54) BRAKING CONTROL METHOD AND SYSTEM FOR ECO-FRIENDLY VEHICLE

(71) Applicant: Hyundai Motor Company, Seoul (KR)

(72) Inventor: Joon Young Park, Seoul (KR)

(73) Assignee: Hyundai Motor Company, Seoul (KR)

(*) Notice: Subject to any disclaimer, the term of this patent is extended or adjusted under 35 U.S.C. 154(b) by 119 days.

(21) Appl. No.: 15/198,917

(22) Filed: Jun. 30, 2016

(65) Prior Publication Data

US 2017/0113555 A1    Apr. 27, 2017

(30) Foreign Application Priority Data

Oct. 21, 2015  (KR) .................. 10-2015-0146386

(51) Int. Cl.
*B60L 7/26*  (2006.01)
*B60L 15/20* (2006.01)
(Continued)

(52) U.S. Cl.
CPC ............. *B60L 7/26* (2013.01); *B60L 15/2009* (2013.01); *B60L 50/16* (2019.02); *B60W 10/00* (2013.01); *B60L 2240/463* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(58) Field of Classification Search
CPC ............................ B60L 7/26; B60L 2240/463
USPC ........................................................ 701/70
See application file for complete search history.

(56) References Cited

U.S. PATENT DOCUMENTS

2016/0264111 A1* 9/2016 Doi .................. B60T 8/1766
2017/0021731 A1* 1/2017 Suzuki ................. B60L 7/26
2017/0106755 A1* 4/2017 Nakatsu ................ B60L 7/26

FOREIGN PATENT DOCUMENTS

JP     2004-357375 A     12/2004
JP      3945030 B2       7/2007
(Continued)

OTHER PUBLICATIONS

"WD vs AWD vs 4WD a guide to the differences and which is best for you"; https://www.consumerreports.org/cro/2012/12/2wd-awd-or-4wd-how-much-traction-do-you-need/index.htm; retrieved Sep. 5, 2017.*

*Primary Examiner* — Anne M Antonucci
(74) *Attorney, Agent, or Firm* — Mintz Levin Cohn Ferris Glovsky and Popeo, P.C.; Peter F. Corless

(57) ABSTRACT

A braking control method for a vehicle is provided. The vehicle distributes and transmits a driving force of a vehicle driving source to front and rear wheels based on a power distribution rate. The method includes determining a total braking force based on a brake signal corresponding to brake pedal manipulation, calculating a front and rear wheel braking force satisfying the total braking force, and calculating a regenerative and frictional braking force satisfying the total braking force. The method further includes determining a power distribution rate range to the front and rear wheels during braking using the calculated front and rear wheel braking force and regenerative braking force, determining a power distribution rate to the front and rear wheels based on a vehicle driving condition, within the determined power distribution rate range; and adjusting distribution of the power to the front and rear wheels at the power distribution rate.

16 Claims, 5 Drawing Sheets

(51) Int. Cl.
*B60W 10/00* (2006.01)
*B60L 50/16* (2019.01)

(56) References Cited

FOREIGN PATENT DOCUMENTS

| | | |
|---|---|---|
| JP | 2014-069756 A | 4/2014 |
| JP | 2014-087251 A | 5/2014 |
| JP | 2014-218137 A | 11/2014 |
| KR | 10-2002-0066846 A | 8/2002 |
| KR | 10-1076284 | 10/2011 |

* cited by examiner

[ 2WD TMED ]

[ AWD TMED ]

BRAKING CONTROL METHOD AND SYSTEM FOR ECO-FRIENDLY VEHICLE

CROSS-REFERENCE TO RELATED APPLICATION

This application claims under 35 U.S.C. § 119(a) the benefit of Korean Patent Application No. 10-2015-0146386 filed on Oct. 21, 2015, the entire contents of which are incorporated herein by reference.

BACKGROUND (a) Technical Field

The present disclosure relates to a braking control method and system for an eco-friendly vehicle, and more particularly, to a braking control method and system for an eco-friendly vehicle which improves braking stability and regenerative braking efficiency through optimal distribution of front/rear wheel power of an all-wheel-drive (AWD) driving system while braking.

(b) Background Art

As is well known, when a vehicle which is driven using an electric motor, that is, an eco-friendly vehicle such as a pure electric vehicle (EV), a hybrid electric vehicle (HEV), or a fuel cell vehicle (FCV) applies a brake (e.g., when a brake is engaged), regenerative braking is performed. A regenerative braking system of the eco-friendly vehicle converts kinetic energy of the vehicle into electric energy and stores the energy in a battery while braking the vehicle and then reuses the energy to drive an electric motor when the vehicle is driven, to thus improve fuel efficiency of the vehicle.

In the vehicle in which the regenerative braking is performed, a regenerative braking co-operative control technique which adjusts a sum of a regenerative braking torque generated in the electric motor (a driving motor) and a frictional braking torque generated in a brake device to be equal to a driver demand braking torque during the regenerative braking is required. In particular, it is necessary to appropriately distribute an electric braking force caused by an electricity generating operation and a rotational resistance of the electric motor, that is, a regenerative braking force and a frictional braking force by a frictional braking device and thus, co-operative control between controllers needs to be appropriately performed.

In a general eco-friendly vehicle according to the related art, a hydraulic braking device is used as a frictional braking device and a driver demand braking force which is a target braking force to decelerate the vehicle is calculated based on a brake signal that corresponds to manipulation of a brake pedal, that is, a signal of a brake pedal sensor (BPS) based on manipulation of a brake pedal, and a regenerative braking force and a hydraulic braking force are distributed to satisfy a total braking force, using the driver demand braking force as the total braking force which needs to be generated in the vehicle.

When a regenerative braking torque and a hydraulic braking torque are determined by distributing the regenerative braking force by an electric motor and a hydraulic braking force by a hydraulic braking device, regenerative braking and hydraulic braking are adjusted to obtain distributed torque values. In addition, an electronic braking force distribution system (EBD) in the vehicle distributes braking force to front wheels and real wheels to maximize a braking force and an electric and hydraulic braking system (EHB) in an eco-friendly vehicle, such as an electric vehicle or a hybrid electric vehicle, distributes the driver demand braking force into the regenerative braking force by the electric motor and the hydraulic braking force by the hydraulic braking device.

In a general eco-friendly vehicle, when the electric motor which is a driving source is disposed in the front wheels or the rear wheels to use the front wheels or the rear wheels as driving wheels, the regenerative braking is performed only on the driving wheels. For example, when the front wheels are the driving wheels, after distributing the braking force into the front wheels and the rear wheels, the regenerative braking force and the hydraulic braking force are distributed into the front wheels on which the electric motor is disposed and the braking is performed on the rear wheels only by the hydraulic braking force device.

In the eco-friendly vehicle which performs only the front wheel regenerative braking, the electric motor configured to drive the vehicle is disposed on the front wheels. When the battery is charged by the electric motor to recover the energy, the regenerative braking force by the electric motor is applied only to the front wheels which are the driving wheels. However, in an all-wheel drive (AWD) vehicle in which the driving force from the driving source is distributed into the front wheels and the rear wheels, when the vehicle is driven, the driving force is distributed to the front wheels and the rear wheels. However, there is no strategy for distributing the regenerative braking force to the front wheels and the rear wheels when the AWD vehicle applies a brake.

In particular, with reference to the drawings, FIG. 1 is a view illustrating a configuration of a power train of a two wheel drive (2WD) transmission mounted electric device (TMED) hybrid electric vehicle in which an electric motor, that is, a driving motor is disposed in a transmission according to the related art. In a general TMED system, an engine clutch 12 is disposed between two driving sources which drive a vehicle, that is, an engine 11 and a driving motor 13 and the transmission 14 is disposed at an output side of the driving motor 13. The engine clutch 12 is engaged to or disengaged from the engine 11 and the driving motor 13 to connect or disconnect the power between the engine 11 and the driving motor 13 and the transmission 14 is configured to change the power of the engine 11 and the driving motor 13 to transmit the changed power to a driving shaft of the driving wheels 16.

In this configuration, when the engine clutch 12 is engaged, parallel mode driving in which the power of the engine 11 and the driving motor 13 is transmitted to the driving wheels 16 through the transmission 14 is performed. A starter-generator 17 which is connected to the engine to transmit the power is provided and the starter-generator 17 is configured to transmit the power while driving to the engine 11 to start the engine or generate electricity by a rotational force transmitted from the engine.

The battery 19 is charged by electric energy which is generated when the starter-generator 17 generates electricity. The battery 19 which is a power source (e.g., an electric power source) of the vehicle is connected to the driving motor 13 and the starter-generator 17 via an inverter 18 to be charged and discharged and the inverter 18 is configured to convert a direct current (DC) of the battery 19 into a three phase alternative current (AC) to apply the current, thereby driving the driving motor 13 and the starter-generator 17. Differently from the 2WD vehicle, a transfer case is provided in an AWD vehicle and the driving force transmitted from the driving source is distributed into the front wheels and the rear wheels through the transfer case.

In other words, for the transfer case, an electronic transfer is used which is provided at the output side of the transmission to distribute the driving force transmitted through the transmission into the front wheels and the rear wheels based on a power distribution rate determined in accordance with a driving condition of the vehicle and to vary the driving force distribution to the front wheels and the rear wheels to be 0 to 100%.

A regenerative braking distribution control technique of the related art is developed in consideration of the 2WD vehicle as illustrated in FIG. 1 and the driving motor 13 is connected only to the front wheels or the rear wheels which are the driving wheels 16, and thus, braking force distribution to the front wheels and the rear wheels and the regenerative braking force and hydraulic braking force distribution to the driving wheels are sequentially and independently performed. For example, regenerative braking distribution of a 2WD hybrid electric vehicle in which the front wheels are driving wheels will be described herein below.

First, when a brake signal based on manipulation of a brake pedal is generated and the driver demand braking force, that is, a total braking force required in the vehicle is determined based on the brake signal, an electronic control unit (ECU: which may be the ABS and the ECU)) of the EBD is configured to distribute the braking force into the front wheels 16 and the rear wheels as described below, using driving state information of the vehicle and vehicle weight distribution information due to the number of passengers and a loading weight.

Total braking force=Front wheel braking force+Rear wheel braking force

Further, when the braking force is distributed into the front wheels and the rear wheels, the electronic control unit of the EHB is configured to distribute the braking force of the front wheels 16 which are driving wheels into the regenerative braking force and the frictional braking force (hydraulic braking force) as described below, based on information regarding the motor state and the battery state.

Front wheel braking force=Regenerative braking force+Frictional braking force

As a result, with respect to the rear wheels (not illustrated in FIG. 1) to which a driving system of the vehicle is not connected, control of the frictional braking device (e.g., hydraulic braking device) is performed to generate a rear wheel braking force only using frictional braking and with respect to the front wheels 16, the regenerative braking control of the motor and control of the frictional braking device are performed under co-operative control of a controller within the vehicle which is known to generate the regenerative braking force and the frictional braking force which satisfy the distributed front wheel braking force.

However, in the AWD hybrid electric vehicle, the power distribution rate is determined based on information collected from the vehicle while the vehicle is driven and the transfer case is operated based on the determined power distribution rate only to adjust the distribution of the driving force (e.g., power distribution rate). However, there is no front/rear wheel distributing technique of a substantially large braking force, such as regenerative braking, and specifically, no AWD power distributing technique which satisfies both the front/rear wheel braking distribution and regenerative braking/frictional braking distribution.

When the existing driving power-based AWD vehicle power distributing strategy in regenerative braking of the AWD vehicle through front wheels and rear wheels is applied to the regenerative braking, an area where the regenerative braking recovery efficiency is decreased is generated, which will be described with the following example. An example in which the braking is performed in a state where the AWD power distribution rate of the vehicle is determined to be 100% in the front wheels will be described.

First, when the vehicle brake is engaged, a total braking force which is demanded by a driver is distributed to target braking forces for the front wheels and the rear wheels, that is, a front wheel braking force 21 (Front) and a rear wheel braking force 22 (Rear) using information such as a vehicle driving situation and vehicle weight distribution, as illustrated in FIG. 2 (step 1).

Further, the EHB is configured to distribute the total braking force into the regenerative braking force 23 (Regenerative) and a frictional braking force 24 (Hydraulic) based on information regarding a motor state and a battery state (see step 2 of FIG. 2 of the related art). In particular, when the AWD power distributing method which does not consider the regenerative braking recovery efficiency is applied, in a state where the current power distribution rate of the transfer case is 100% in the front wheels, the regenerative braking force is also applied only to the front wheels. Therefore, the regenerative braking force distributed in step 2 may exceed the front wheel braking force distributed in step 1.

However, the regenerative braking force should not exceed the distributed front wheel braking force. Therefore, when the regenerative braking force determined in step 2 exceeds the front wheel braking force, the regenerative braking amount requires limitation when controlling the braking of the vehicle (step 3). As a result, a regenerative braking loss that corresponds to an amount which exceeds the front wheel braking force excluding effective regenerative braking corresponding to the front wheel braking force should be caused.

When 100% of the regenerative braking force which is limited in a state where the power distributing rate of the transfer case is 100% in the front wheels is applied to the front wheels, only the frictional braking force (hydraulic braking force) is applied to the rear wheels. In particular, even though the regenerative braking may be additionally used, the regenerative braking amount to the front wheels is limited and when the braking is controlled, the frictional braking amount (hydraulic braking amount) for the rear wheels needs to be increased compared to the amount determined in step 2 to satisfy the total braking force and the rear wheel braking force in step 1.

The above information disclosed in this section is merely for enhancement of understanding of the background of the invention and therefore it may contain information that does not form the prior art that is already known in this country to a person of ordinary skill in the art.

SUMMARY

The present invention provides a braking control method for an eco-friendly vehicle which solves a problem caused by absence of regenerative braking distribution control for front/rear wheels in an AWD eco-friendly vehicle, that is, a problem in that the energy recovery efficiency of the regenerative braking may be reduced and unnecessary hydraulic braking amount may increase, and may improve the braking stability and regenerative braking efficiency through optimal front/rear wheel power distribution of the AWD driving system during the braking.

In one aspect, the present invention provides a braking control method for an all-wheel drive (AWD) eco-friendly vehicle which distributes and transmits a driving force of a vehicle driving source to front wheels and rear wheels based on a controlled power distribution rate, the method including: determining a total braking force based on a brake signal that corresponds to manipulation of a brake device by a driver; calculating a front wheel braking force and a rear wheel braking force which satisfy the total braking force; calculating a regenerative braking force and a frictional braking force which satisfy the total braking force; determining a range of a power distribution rate to the front wheels and the rear wheels during braking of the vehicle using the calculated front wheel braking force, rear wheel braking force, and regenerative braking force; determining a power distribution rate to the front wheels and the rear wheels based on a vehicle driving condition, within the determined range of the power distribution rate; and adjusting distribution of the power to the front wheels and the rear wheels at the determined power distribution rate.

According to the braking control method for an eco-friendly vehicle of the present invention, front/rear wheel power distribution which satisfies both the front/rear wheel braking distribution and regenerative/frictional braking distribution when an AWD vehicle applies a brake may be performed to improve braking stability and regenerative braking efficiency while braking.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
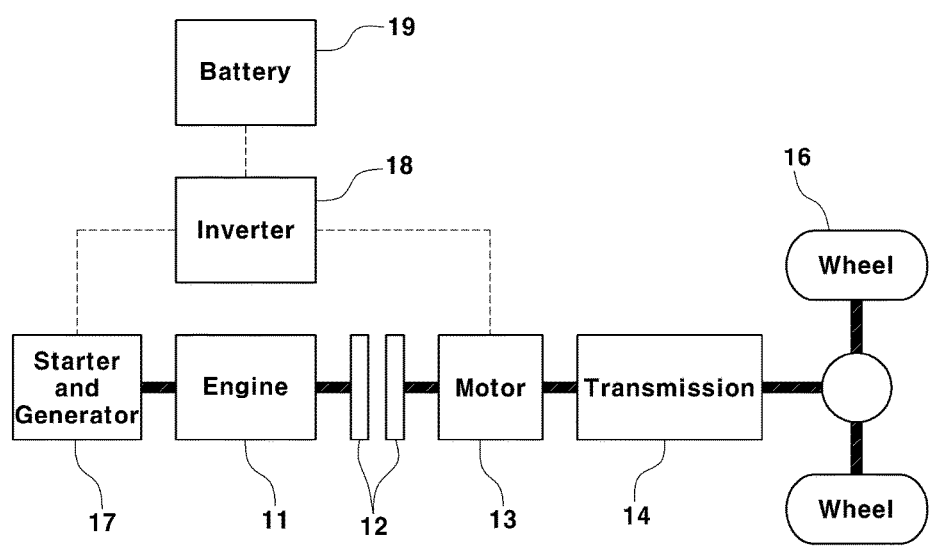
FIG. 1 is a view schematically illustrating a configuration of a power train of a TMED 2WD hybrid electric vehicle according to the related art.
Figure 2:
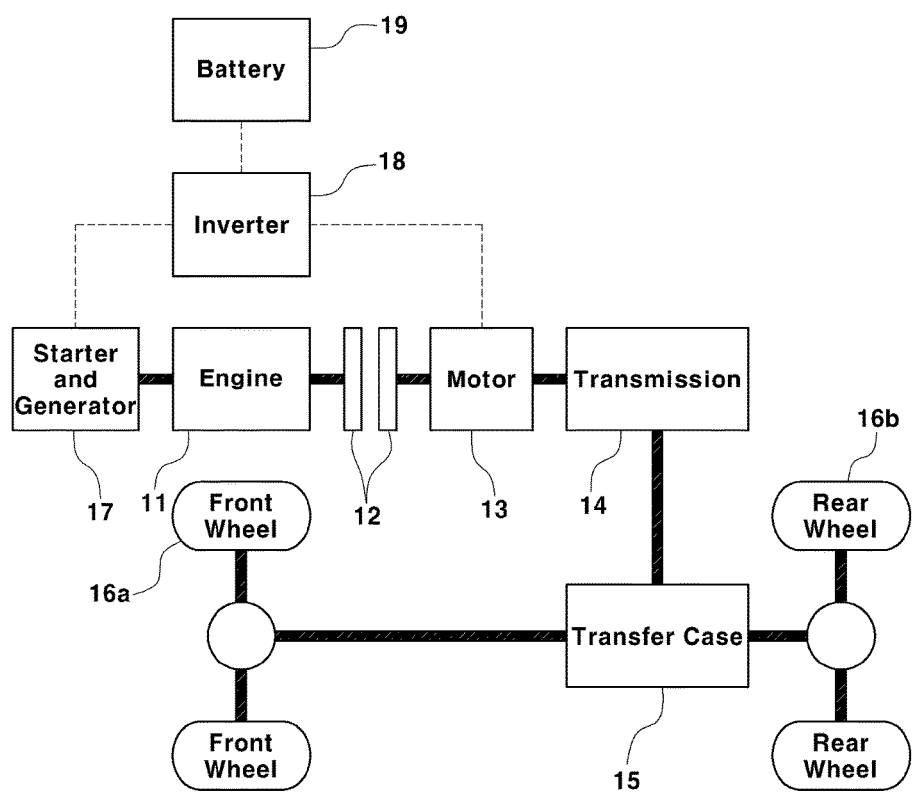
FIG. 2 is a view illustrating a problem when a driving force based AWD vehicle power distributing strategy of the related art is applied to regenerative braking force distribution.

Reference numerals set forth in the Drawings includes reference to the following elements as further discussed below.

11: engine
12: engine clutch
13: driving motor
14: transmission
15: transfer case
16: driving wheel
16a: front wheel
16b: rear wheel
17: starter-generator
18: inverter
19: battery It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Hereinafter, exemplary embodiments of the present invention will be described more fully with reference to the accompanying drawings, so as to be easily carried out by those skilled in the art.

Figure 3:
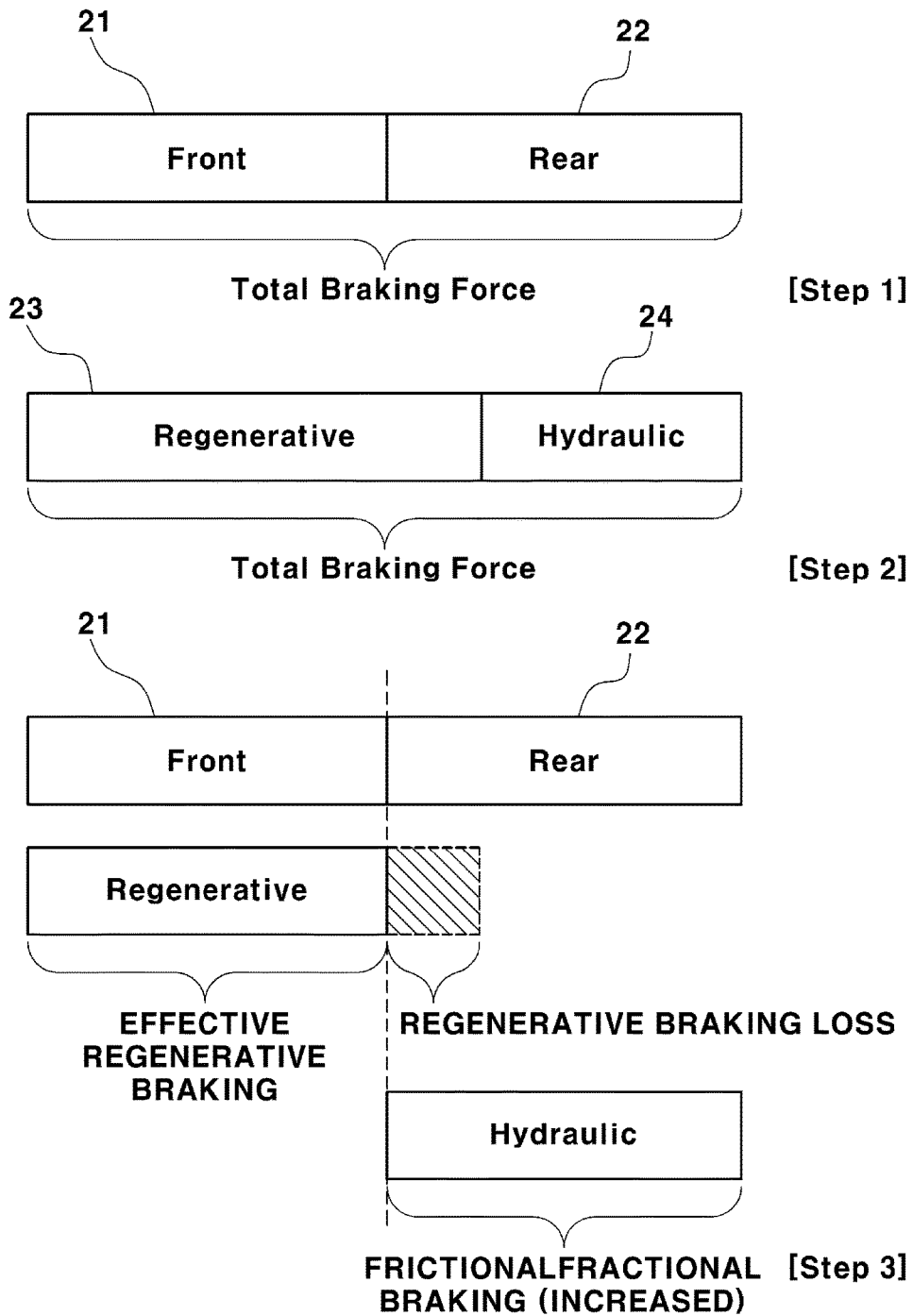
FIG. 3 is a view schematically illustrating a configuration of a power train of a TMED AWD hybrid vehicle according to an exemplary embodiment of the present invention.
Figure 4:
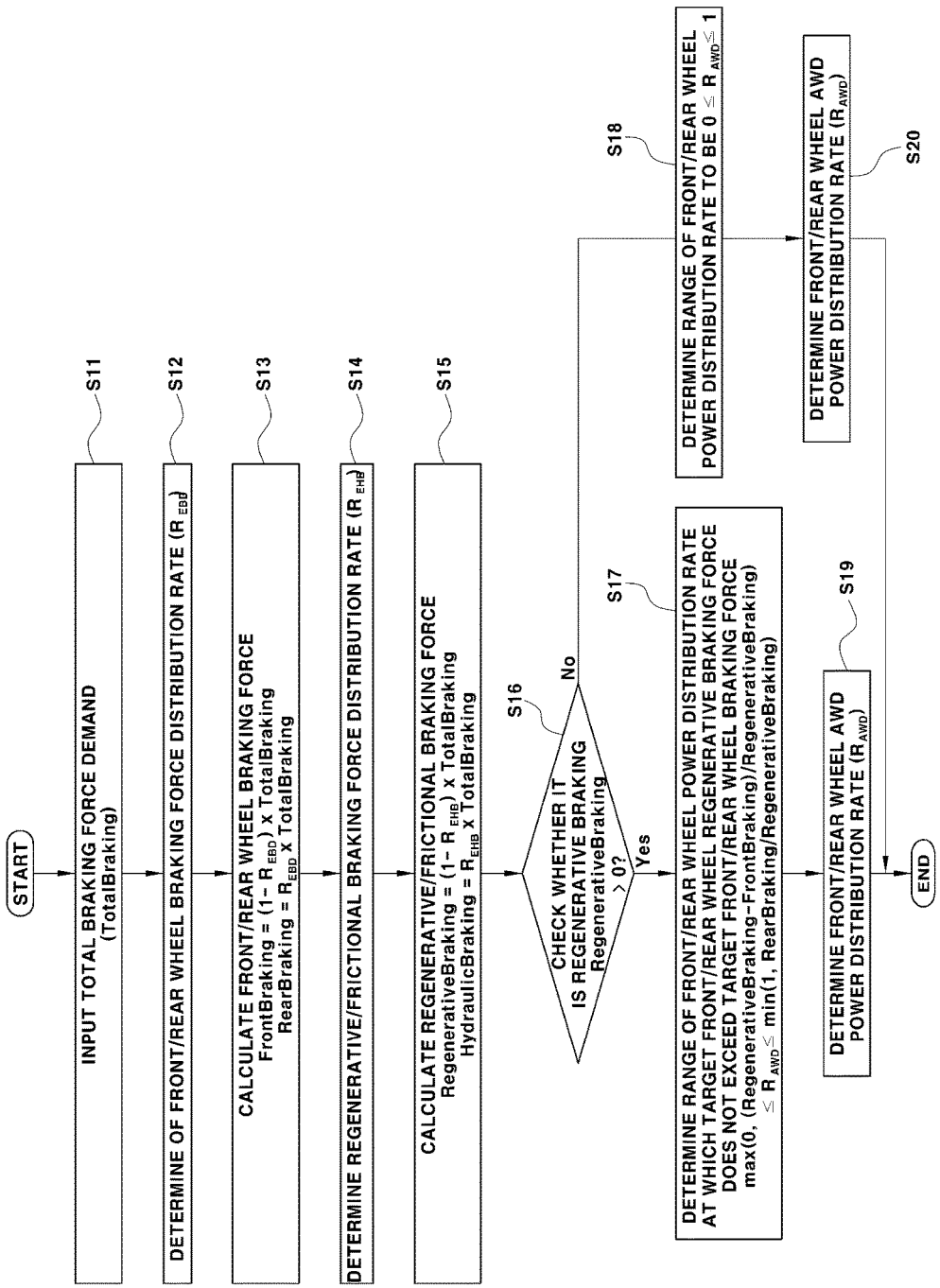
FIG. 4 is a flowchart illustrating a braking control process of an all-wheel drive (AWD) eco-friendly vehicle according to an exemplary embodiment of the present invention.
Figure 5:
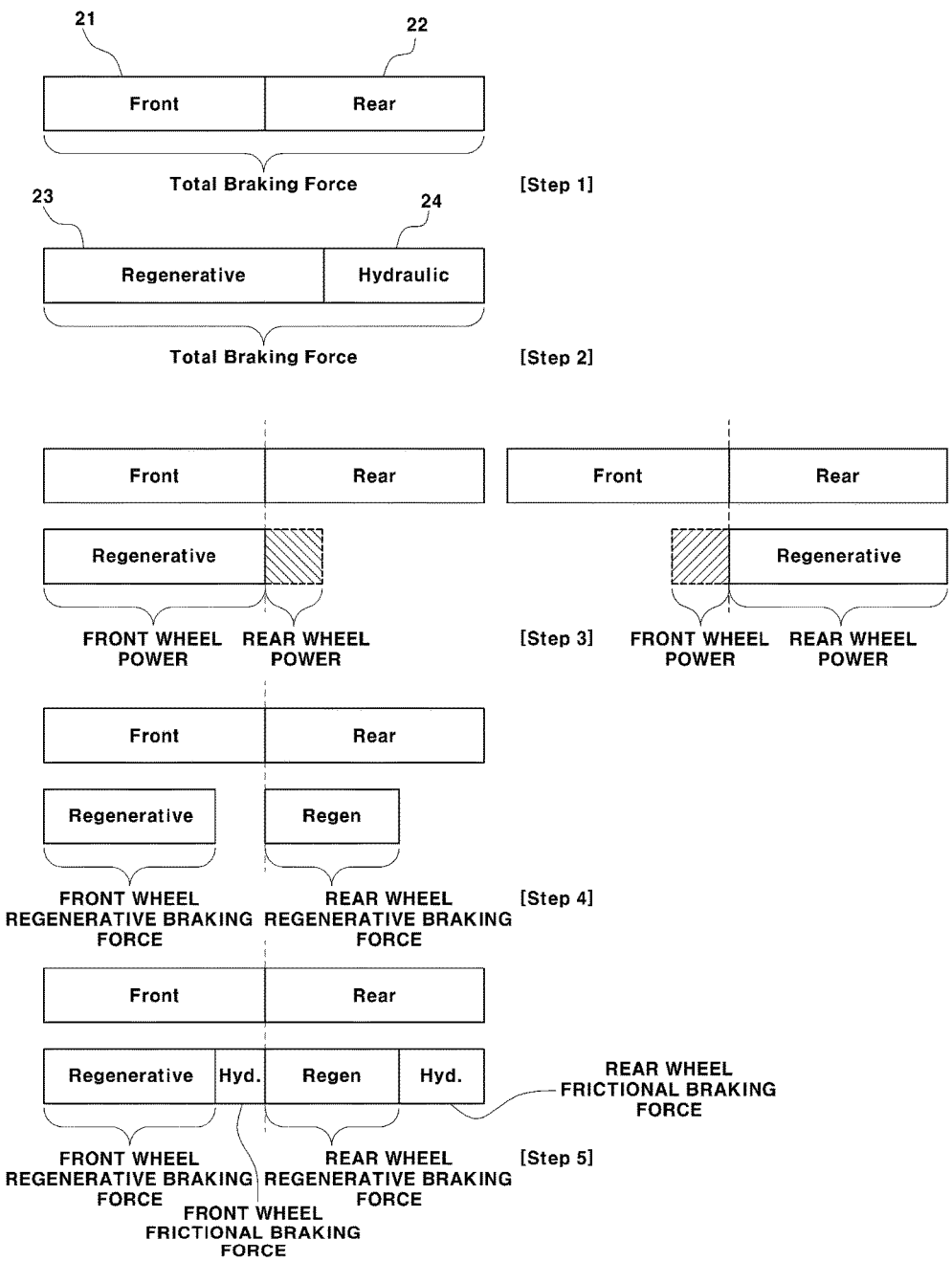
FIG. 5 is a view illustrating a process of distributing a braking force into front wheels and rear wheels in accordance with a braking control method according to an exemplary embodiment of the present invention and a state thereof.

FIG. 3 illustrates a configuration of an all-wheel drive (AWD) TMED power train and specifically, illustrates a configuration of a four-wheel drive (4WD) power train in which power of an engine 11 and a driving motor 13 which are driving sources to drive the vehicle may be transmitted to both front wheels 16a and rear wheels 16b. FIG. 4 is a flowchart illustrating a braking control process of an all-wheel drive (AWD) eco-friendly vehicle according to an exemplary embodiment of the present invention and FIG. 5 is a view illustrating a process of distributing a braking force to front wheels and rear wheels in accordance with a braking control method according to an exemplary embodiment of the present invention and a state thereof.

First, when a brake signal that corresponds to manipulation of a brake pedal by a driver when the driver applies pressure onto a brake pedal (e.g., the brake pedal is engaged) while driving the AWD eco-friendly vehicle may be generated and a driver demand braking force, that is, a total braking force required to be generated may be determined based on the brake signal, as a demand of total braking force is input in step S11, an electronic control unit (ECU) of an EBD may be configured to distribute the total braking force into a front wheel braking force and a rear wheel braking force as represented in the following Equation 1.

$$\text{Total braking force} = \text{Front wheel braking force} + \text{Rear wheel braking force} \quad (1)$$

In the process of distributing a front/rear wheel braking force, a braking force distribution rate $R_{EBD}$ (a value between 0 and 1) for the front wheels 16a and the rear wheels 16b may be determined based on driving state information of the vehicle and vehicle weight distribution information due to the number of passengers and a loading weight in step S12 and a front wheel braking force and a rear wheel braking force may be calculated based on the determined braking force distribution rate $R_{EBD}$ of the front wheels and the rear wheels in step S13.

In the above description, a process of determining the braking force distribution rate $R_{EBD}$ using a vehicle condition at the time of braking, that is, the driving state information of the vehicle and the vehicle weight distribution information is well known, and thus, a detailed description thereof will be omitted. In the exemplary embodiment of the present invention, the braking force distribution rate $R_{EBD}$ may be determined by the EBD based on the braking stability and the braking force distribution rate $R_{EBD}$ may be defined as a ratio value of a rear wheel braking force with respect to the total braking force.

Therefore, when the braking force distribution rate $R_{EBD}$ is 0 ($R_{EBD}=0$), only the front wheel braking is requested (100% in the front wheels) and the front wheel braking force at this time may be determined as the total braking force. When the braking force distribution rate $R_{EBD}$ is 1 ($R_{EBD}=1$), only the rear wheel braking is requested (100% in the rear wheels) and the rear wheel braking force at this time may be determined as the total braking force. As a result, the front wheel braking force (FrontBraking) and the rear wheel braking force (RearBraking) which satisfy the above Equation (1) may be calculated from the total braking force (TotalBraking) and the braking force distribution rate ($R_{EBD}$) as represented in the following Equations.

$$\text{Front wheel braking force} = (1 - R_{EBD}) \times \text{Total braking force} \quad (2)$$

$$\text{Rear wheel braking force} = R_{EBD} \times \text{Total braking force} \quad (3)$$

After distributing the braking force to the front wheels 16a and the rear wheels 16b as described above, the electronic control unit of the EHB may be configured to distribute the total braking force into the regenerative braking force and the frictional braking force (hydraulic braking force) as described below.

$$\text{Total braking force} = \text{Regenerative braking force} + \text{Frictional braking force} \quad (4)$$

In the process of distributing the regenerative braking force and the frictional braking force, the braking force distribution rate $R_{EHB}$ for the regenerative braking force and the frictional braking force may be determined based on information regarding a motor state and a battery state in step S14 and the regenerative braking force and the frictional braking force may be calculated based on the determined braking force distribution rate $R_{EHB}$ in step S15. In the above description, a process of determining the braking force distribution rate $R_{EHB}$ using the information regarding a motor state and a battery state at the time of braking the vehicle is well known, and thus detailed description thereof will be omitted.

In the exemplary embodiment of the present invention, the braking force distribution rate $R_{EHB}$ of the regenerative braking force and the frictional braking force may be a value indicating a maximum energy recovery efficiency using the information regarding the motor state and the battery state as described above and may be determined by the EHB. Such a braking force distribution rate $R_{EHB}$ may be defined as a ratio value of the frictional braking force with respect to the total braking force. Therefore, when the braking force distribution rate $R_{EHB}$ is 0 ($R_{EHB}=0$), only the regenerative braking may be requested (the regenerative braking is 100%) and the regenerative braking force at this time may be determined as the total braking force.

Additionally, when the braking force distribution rate $R_{EHB}$ is 1 ($R_{EHB}=1$), only the frictional braking may be requested (the frictional braking is 100%) and the frictional braking force at this time may be determined as the total braking force. Accordingly, the regenerative braking force (RegenerativeBraking) and the frictional braking force (HydraulicBraking) which satisfy the above Equation (4) may be calculated from the total braking force (TotalBraking) and the braking force distribution rate ($R_{EHB}$) as represented in the following Equations.

$$\text{Regenerative braking force} = (1 - R_{EHB}) \times \text{Total braking force} \quad (5)$$

$$\text{Frictional braking force} = R_{EHB} \times \text{Total braking force} \quad (6)$$

Furthermore, the AWD electronic control unit of the vehicle (e.g., vehicle controller) may be configured to determine the front/rear wheel power distribution rate $R_{AWD}$ of the AWD based on the braking force distribution rate $R_{EBD}$ of the front wheels and the rear wheels and the braking force distribution rate $R_{EHB}$ of the regenerative braking force and the frictional braking force. In other words, the AWD power distribution rate $R_{AWD}$ for the front wheels and the rear wheels which may satisfy the distribution state of the front wheel braking force and the rear wheel braking force and the distribution state of the regenerative braking force and the frictional braking force may be determined and in this case, the power distribution rate $R_{AWD}$ of the front wheels and the rear wheels may be defined as a ratio value of the power distributed to the rear wheels 16b with respect to the total power transmitted to the front wheels and the rear wheels through the transfer case 15.

For a system which includes a front wheel driving motor configured to drive the front wheels and a rear wheel driving motor configured to drive the rear wheels instead of the transfer case to perform 4WD driving by the front wheel driving motor and the rear wheel driving motor, the power distribution rate $R_{AWD}$ of the front wheels and the rear wheels may be defined as a ratio value of the power distributed to the rear wheels 16b with respect to the total power by the front wheel driving motor and the rear wheel driving motor.

In the following description, a configuration in which the power is distributed into the front wheels and the rear wheels by operating the transfer case will be described as an example. However, the present invention may further include a braking control method for an eco-friendly vehicle in which a system which is 4WD drivable by the front wheel driving motor and the rear wheel driving motor is mounted.

When the transfer case is mounted, the transfer case may be controlled to mechanically distribute the power to the front wheels and the rear wheels. However, in the system in which the front wheel driving motor and the rear wheel driving motor are mounted, individual driving motors may be operated to distribute the power to the front wheels and the rear wheels. Therefore, in the following description, the power distribution by the transfer case may be replaced with the power distribution by the front wheel driving motor and the rear wheel driving motor in a system in which the front wheel driving motor and the rear wheel driving motor are mounted.

In a general transfer case 15, when the power distribution rate $R_{AWD}$ is defined based on a time when the vehicle is driven, the power distribution rate $R_{AWD}$ may be defined as a ratio value of the driving force which is distributed to the rear wheels 16b with respect to the total driving force which is output from the engine 11 and the driving motor 13 which are two driving sources and may be transmitted to the transfer case 15 via the transmission 14.

When an electronic transfer case 15 which varies the distribution of the driving force between 0 and 100% ($R_{AWD}$ 0 to 1) is adjusted to represent the specific power distribution rate $R_{AWD}$, when the brake is engaged, the power distribution rate $R_{AWD}$ indicates a ratio value of the rear wheel regenerative braking force with respect to the total regenerative braking force determined by Equation 5. In particular, when both the front wheels 16a and the rear wheels 16 are connected to the driving motor 13 which performs the regenerative braking through the transfer case 15 to transmit the power, the regenerative braking force of the front wheels 16a and the regenerative braking force of the rear wheels 16b may also be distributed based on the adjusted power distribution rate $R_{AWD}$ of the transfer case 15, similarly to the driving force, to perform the regenerative braking.

In other words, when the transfer case 15 is controlled to show a specific power distribution rate $R_{AWD}$ and the regenerative braking is performed by the driving motor 13, the regenerative braking amount of the front wheels 16a and the regenerative braking amount of the rear wheels 16b may be obtained based on the specific power distribution rate $R_{AWD}$ (see the following Equations 7 and 8). Therefore, when the power distribution rate $R_{AWD}$ of the transfer case 15 is 0 ($R_{AWD}$=0), only the regenerative braking of the front wheels 16a may be requested (e.g., the regenerative braking of the front wheels is 100%) and in this case, the regenerative braking force of the front wheels 16a may be determined by the regenerative braking force (Total regenerative braking force) calculated by the above Equation 5.

When the power distribution rate $R_{AWD}$ of the transfer case 15 is 1 ($R_{AWD}$=1), only the regenerative braking of the rear wheels 16b may be requested (the regenerative braking of the rear wheels is 100%) and in this case, the regenerative braking force of the rear wheels 16b may be determined by the total regenerative braking force. Accordingly, the front wheel regenerative braking force (FrontRegenBraking) and the rear wheel regenerative braking force (RearRegenBraking) may be calculated from the total regenerative braking force (RegenerativeBraking) and the power distribution rate ($R_{AWD}$) as represented in the following Equations.

$$\text{Front wheel regenerative braking force}=(1-R_{AWD})\times \text{Total regenerative braking force} \quad (7)$$

$$\text{Rear wheel regenerative braking force}=R_{AWD}\times \text{Total regenerative braking force} \quad (8)$$

Particularly, the front wheel regenerative braking force and the rear wheel regenerative braking force do not exceed the front wheel braking force (FrontBraking) calculated by the above Equation 2 and the rear wheel braking force (RearBraking) calculated by the above Equation 3, respectively, and thus, a relationship between the front/rear wheel braking force and the total regenerative braking force will be represented as below.

$$\text{Front wheel braking force}\geq(1-R_{AWD})\times\text{Total regenerative braking force}=\text{Front wheel regenerative braking force} \quad (9)$$

$$\text{Rear wheel braking force}\geq R_{AWD}\times\text{Total regenerative braking force}=\text{Rear wheel regenerative braking force} \quad (10)$$

As a result, a range of the AWD power distribution rate $R_{AWD}$ of the transfer case 15 may be determined as below.

$$(\text{Total regenerative braking force}-\text{Front wheel braking force})/\text{Total regenerative braking force}\leq R_{AWD}\leq \text{Rear wheel braking force}/\text{Total regenerative braking force} \quad (11)$$

Further, the power distribution rate of the transfer case 15 has a value between 0 and 1, and thus, a possible power distribution rate range may be finally determined as below (steps S16 and S17).

$$\max(0,(\text{Total regenerative braking force}-\text{Front wheel braking force})/\text{Total regenerative braking force})\leq R_{AWD}\leq \min(1,\text{Rear wheel braking force}/\text{Total regenerative braking force}) \quad (12)$$

Accordingly, the AWD electronic controller may be configured to determine the power distribution rate $R_{AWD}$ within a range of Equation 12 and in this case, determine the power distribution rate $R_{AWD}$ having a specific value within a range of the above Equation 12 based on the vehicle driving condition such as a vehicle speed and a road condition in step S19. When the regenerative braking force is not distributed based on information such as the motor state and the battery state in steps S14 and 15 and the total braking force is satisfied by the frictional braking force (the regenerative braking force: 0), the front/rear wheel AWD power distribution rate $R_{AWD}$ of the transfer case 15 may be determined in a range of 0 to 1 ($0 \leq R_{AWD} \leq 1$) in step S18 and subsequently, the power distribution rate $R_{AWD}$ having a specific value within the range of 0 to 1 may be determined based on the vehicle driving condition such as the vehicle speed and the road condition in step S20.

When the power distribution rate is determined while the vehicle is being decelerated (e.g., a brake pedal is engaged) as described above, the AWD electronic may be configured to operate the transfer case 15 to show the power distribution state that corresponds to the above-determined power distribution rate $R_{AWD}$, and then the front/rear wheel power distribution in the transfer case 15 may be performed based on the power distribution rate $R_{AWD}$.

Simultaneously, the regenerative braking control of the driving motor and the control of the frictional braking device may be performed under the co-operative control of controllers within the vehicle and in this case, the regenerative braking force which is distributed to the front/rear wheels based on the power distribution rate $R_{AWD}$ of the transfer case 15 may be operated. When the distributed regenerative braking force is applied to the front wheels 16a and the rear wheels 16b, braking forces of the front wheels 16a and the rear wheels 16b which are additionally required in addition to the regenerative braking force may be handled by the frictional braking device of the front wheels and the frictional braking device of the rear wheels.

In other words, the frictional braking device of the front wheels 16a may be operated to generate a frictional braking force that corresponds to a difference between the front wheel braking force and the front wheel regenerative braking force and the frictional braking device of the rear wheels 16b may be operated to generate a frictional braking force that corresponds to a difference between the rear wheel braking force and the rear wheel regenerative braking force. In particular, the front wheel braking force may be calculated by Equation 2 and the front wheel regenerative braking force may be calculated by Equation 7 using the above-determined power distribution rate $R_{AWD}$.

Similarly, the rear wheel braking force may be calculated by Equation 3 and the rear wheel regenerative braking force may be calculated by Equation 8 using the above-determined power distribution rate $R_{AWD}$. As described above, according to the braking control method of the present invention, when the AWD vehicle engages a brake, the front/rear wheel power distribution which satisfies both the front/rear wheel braking distribution and the regenerative/frictional braking distribution may be performed to improve braking stability and regenerative braking efficiency.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A braking control method for an all-wheel drive (AWD) eco-friendly vehicle which distributes and transmits a driving force of a vehicle driving source to front wheels and rear wheels based on a controlled power distribution ratio, the method comprising:
   determining, by a controller, a total braking force based on a brake signal that corresponds to manipulation of a brake pedal;
   calculating, by the controller, a front wheel braking force and a rear wheel braking force which satisfy the total braking force;
   calculating, by the controller, a regenerative braking force and a frictional braking force which satisfy the total braking force;
   determining, by the controller, a range of a power distribution ratio of the front wheels to the rear wheels during braking of the vehicle using the calculated front wheel braking force, rear wheel braking force, and regenerative braking force;
   determining, by the controller, a power distribution ratio $R_{AWD}$ of the front wheels to the rear wheels based on a vehicle driving condition, within the determined range of the power distribution ratio; and
   adjusting, by the controller, distribution of the power to the front wheels and the rear wheels to be the determined power distribution ratio $R_{AWD}$ such that the regenerative braking force is distributed to the front wheels and rear wheels based on the power distribution ratio $R_{AWD}$,
   wherein a front wheel regenerative braking force and a rear wheel regenerative braking force are calculated from the regenerative braking force and the determined power distribution ratio $R_{AWD}$, and
   wherein a frictional braking device of the front wheels is operated to generate a frictional braking force that corresponds to a difference between the front wheel braking force and the front wheel regenerative braking force, and a frictional braking device of the rear wheels is operated to generate a frictional braking force that corresponds to a difference between the rear wheel braking force and the rear wheel regenerative braking force.

2. The method of claim 1, wherein when a transfer case is mounted within the vehicle, the range of the power distribution ratio $R_{AWD}$ and the power distribution ratio $R_{AWD}$ are a range of a power distribution ratio of the transfer case and a power distribution ratio of the transfer case, respectively, and when a front wheel driving motor configured to drive the front wheels and a rear wheel driving motor configured to drive the rear wheels are mounted within the vehicle, the range of the power distribution ratio $R_{AWD}$ and the power distribution ratio $R_{AWD}$ are a range of a power distribution ratio of the front wheel driving motor and the rear wheel driving motor and a power distribution ratio determined from the range of the power distribution ratio.

3. The method of claim 1, wherein in the distribution adjustment of the power to the front wheels and the rear wheels, the transfer case is operated or a front wheel driving motor configured to drive the front wheels and a rear wheel driving motor configured to drive the rear wheels are operated.

4. The method of claim 1, wherein in the determination of a range of a power distribution ratio $R_{AWD}$, when the power distribution ratio $R_{AWD}$ is defined as a ratio value of power distributed to the rear wheels with respect to the total power transmitted to the front wheels and the rear wheels, the power distribution ratio $R_{AWD}$ is determined in a range of max(0,(regenerative braking force−front wheel braking force)/regenerative braking force)$\leq R_{AWD} \leq$min(1,rear wheel braking force/regenerative braking force).

5. The method of claim 1, wherein when the calculated regenerative braking force is 0, and the power distribution ratio $R_{AWD}$ is defined as a ratio value of power distributed to the rear wheels with respect to the total power transmitted to the front wheels and the rear wheels, the power distribution ratio $R_{AWD}$ is determined in the range of $0 \leq R_{AWD} \leq 1$.

6. The method of claim 1, wherein in the determination of a power distribution ratio $R_{AWD}$, the power distribution ratio $R_{AWD}$ based on a vehicle speed and a road condition as the vehicle driving condition is determined.

7. The method of claim 1, wherein the range of the power distribution ratio of the front wheels to the rear wheels is determined that the front wheel regenerative braking force is smaller than the front wheel braking force and the rear wheel regenerative braking force is smaller than the rear wheel braking force.

8. The method of claim 1, wherein when the power distribution ratio $R_{AWD}$ of the transfer case is defined as a ratio value of a power distributed to the rear wheels with respect to the total power transmitted through the transfer case, the front wheel regenerative braking force and the rear wheel regenerative braking force are calculated by the following Equations Front wheel regenerative braking force=$(1-R_{AWD})\times$Regenerative braking force Rear wheel regenerative braking force=$R_{AWD}\times$Regenerative braking force.

9. The method of claim 1, wherein when the power distribution ratio $R_{AWD}$ is defined as a ratio value of power distributed to the rear wheels with respect to the total power transmitted to the front wheels and the rear wheels, the front wheel regenerative braking force and the rear wheel regenerative braking force are calculated by the following equations Front wheel regenerative braking force=$(1-R_{AWD})\times$Regenerative braking force Rear wheel regenerative braking force=$R_{AWD}\times$Regenerative braking force.

10. The method of claim 1, wherein the front wheel braking force and the rear wheel braking force are calculated based on a braking force distribution ratio $R_{EBD}$ determined based on driving state information of the vehicle and vehicle weight distribution information.

11. The method of claim 10, wherein when the braking force distribution ratio $R_{EBD}$ is determined as a ratio value of the rear wheel braking force with respect to the total braking force, the front wheel braking force and the rear wheel braking force are calculated by the following equations Front wheel braking force=$(1-R_{EBD})\times$Total braking force Rear wheel braking force=$R_{EBD}\times$Total braking force.

12. The method of claim 1, wherein the regenerative braking force and the frictional braking force are calculated based on a braking force distribution ratio $R_{EBD}$ determined based on information regarding a motor state and a battery state.

13. The method of claim 12, wherein when the braking force distribution ratio $R_{EHB}$ is determined as a ratio value of the frictional braking force with respect to the total braking force, the regenerative braking force and the frictional braking force are calculated by the following equations Regenerative braking force=$(1-R_{EHB})\times$Total braking force Frictional braking force=$R_{EHB}\times$Total braking force.

14. A braking control system for an all-wheel drive (AWD) eco-friendly vehicle which distributes and transmits a driving force of a vehicle driving source to front wheels and rear wheels based on a controlled power distribution ratio $R_{AWD}$, the system comprising:
a memory configured to store program instructions; and
a processor configured to execute the program instructions, the program instructions when executed configured to:
determine a total braking force based on a brake signal that corresponds to manipulation of a brake pedal;
calculate a front wheel braking force and a rear wheel braking force which satisfy the total braking force;
calculate a regenerative braking force and a frictional braking force which satisfy the total braking force;
determine a range of a power distribution ratio $R_{AWD}$ to the front wheels and the rear wheels during braking of the vehicle using the calculated front wheel braking force, rear wheel braking force, and regenerative braking force;
determine a power distribution ratio $R_{AWD}$ to the front wheels and the rear wheels based on a vehicle driving condition, within the determined range of the power distribution ratio $R_{AWD}$; and
adjust distribution of the power to the front wheels and the rear wheels to be the determined power distribution ratio $R_{AWD}$ such that the regenerative braking force is distributed to the front wheels and rear wheels based on the power distribution ratio $R_{AWD}$,
wherein a front wheel regenerative braking force and a rear wheel regenerative braking force are calculated from the regenerative braking force and the determined power distribution ratio $R_{AWD}$, and
wherein a frictional braking device of the front wheels is operated to generate a frictional braking force that corresponds to a difference between the front wheel braking force and the front wheel regenerative braking force, and a frictional braking device of the rear wheels is operated to generate a frictional braking force that corresponds to a difference between the rear wheel braking force and the rear wheel regenerative braking force.

15. The system of claim 14, wherein when a transfer case is mounted within the vehicle, the range of the power distribution ratio $R_{AWD}$ and the power distribution ratio $R_{AWD}$ are a range of a power distribution ratio of the transfer case and a power distribution ratio of the transfer case, respectively, and when a front wheel driving motor configured to drive the front wheels and a rear wheel driving motor configured to drive the rear wheels are mounted within the vehicle, the range of the power distribution ratio $R_{AWD}$ and the power distribution ratio $R_{AWD}$ are a range of a power distribution ratio of the front wheel driving motor and the rear wheel driving motor and a power distribution ratio determined from the range of the power distribution ratio.

16. The system of claim 14, wherein the range of the power distribution ratio of the front wheels to the rear wheels is determined that the front wheel regenerative braking force is smaller than the front wheel braking force and the rear wheel regenerative braking force is smaller than the rear wheel braking force.

* * * * *